United States Patent [19]
Park

[11] Patent Number: 5,978,734
[45] Date of Patent: Nov. 2, 1999

[54] METHOD FOR DISPLAYING MAP DATA FOR USE IN AN AUTOMOBILE TRAFFIC GUIDANCE SYSTEM

[75] Inventor: In-Ho Park, Suwon, Rep. of Korea

[73] Assignee: Samsung Electronics Co., Ltd., Rep. of Korea

[21] Appl. No.: 08/904,331

[22] Filed: Jul. 31, 1997

[30] Foreign Application Priority Data

Jul. 31, 1996 [KR] Rep. of Korea ................. 1996 32073

[51] Int. Cl.[6] .......................... G06F 165/00; G06G 1/123
[52] U.S. Cl. ..................... 701/211; 701/208; 701/209; 701/202; 340/988; 340/990; 340/995
[58] Field of Search ................................ 701/207, 208, 701/209, 202, 211, 201; 345/352, 348, 349, 354; 340/990, 995, 988; 73/178 R

[56] References Cited

U.S. PATENT DOCUMENTS

| | | |
|---|---|---|
| 4,937,572 | 6/1990 | Yamada et al. .................. 701/208 |
| 5,289,572 | 2/1994 | Yano et al. ..................... 345/352 |
| 5,365,449 | 11/1994 | Kashiwazaki .................... 701/215 |
| 5,430,653 | 7/1995 | Inoue ............................. 701/210 |
| 5,442,349 | 8/1995 | Inque et al. ..................... 701/207 |
| 5,442,557 | 8/1995 | Kaneko .......................... 701/213 |
| 5,699,255 | 12/1997 | Ellis et al. ...................... 701/212 |
| 5,708,787 | 1/1998 | Nakano et al. .................. 345/352 |

Primary Examiner—Jacques H. Louis-Jacques
Attorney, Agent, or Firm—Dilworth & Barrese

[57] ABSTRACT

A method of displaying map data for use in an automobile traffic guidance system classifies map data into categories for user selected display. The classified map data is stored in registers which are selectively driven according to user selected menus of map data. Only selected map data is displayed to the user on an LCD unit by providing a corresponding data signal, clock signal and strobe signal to an LCD driver.

8 Claims, 3 Drawing Sheets

| MENUS | DISPLAY YES/NO | COLOR |
|---|---|---|
| HIGHWAY | [Y] | YELLOW |
| EXPRESSWAY | [Y] | RED |
| INTERSECTION | [Y] | WHITE |
| EDUCATIONAL INSTITUTION | [Y] | GREEN |
| ... | | |
| GAS STATION | [Y] | GRAY |
| ROAD NAME | [N] | |

FIG. 3

METHOD FOR DISPLAYING MAP DATA FOR USE IN AN AUTOMOBILE TRAFFIC GUIDANCE SYSTEM

SUMMARY OF THE INVENTION

1. Field of the Invention

The present invention relates to a method for displaying map data for use with automobile traffic guidance systems which can set a route by a departure place and a destination. More particularly, it relates to a method for displaying map data in an automobile traffic guidance system which accurately and rapidly senses information about a desired menu on a map, and displays only the driver selected menus while on route to his destination.

2. Description of the Related Art

As the number of cars increase, the number of people who are driving alone also increases. Due to the number of vehicles on the roads, and the increasing complication of such roads, drivers who are unsure of the direction to their destination often obstruct traffic. If the driver is searching for a destination for the first time, or does not know an accurate route to the destination in a complicated downtown, he will often be confused and can potentially cause traffic delays. Nevertheless, it is a potentially hazardous and burdensome task to ask a passerby the way to their destination or to spread a map to determine the route to his destination. These acts may obstruct traffic and cause delays.

Current automobile navigation systems use a CD-ROM's (Compact Disk Read Only Memory) in conjunction with a global positioning system (GPS). Data of each map is written very small and the current position of a car is matched with the map data by the GPS. The GPS uses a satellite, a gyro sensor, an earth magnetism sensor, a speed sensor, etc., which enables the easy retrieval of a road, or the selection of a desired route. The route to the destination can be accurately guided by using hardware such as a CD-ROM driver, a map program of the CD-ROM, and the GPS. However, if the driver demands a display of a detailed map screen, many contents of the map such as, for example, roads, intersections, educational institutions, gas stations, government and public offices, buildings, etc. are all simultaneously displayed on one screen. Since the driver cannot make a quick and accurate determination as to the desired map contents, he tries to search the displayed map data of a desired menu.

This attempted search is generally performed while driving and not only hinders their ability to drive safely, but also creates potential hazardous conditions for other drivers.

SUMMARY OF THE INVENTION

It is an object of the invention to provide a method for displaying map data in an automobile traffic guidance system which facilitates safe driving by only displaying user selected characters on a monitor.

It is another object of the invention to provide a method for displaying map data in an automobile traffic guidance system that enables the user to select one or more map menus from a main menu display and selectively activate or deactivate particular map menus being displayed on the monitor.

In one embodiment, the map data is classified according to menus, and each menu is set in a corresponding register. An initial determination is then made as to whether a menu select key is in an ON state, and whether a display mode has been selected. If the menu select is ON, menus are displayed on a liquid crystal display (LCD) unit. The display menus are scrolled through using an up/down key and an input key. Once the desired menu is selected, the corresponding register is selected among a plurality of registers. As a result, only selected map data is received and displayed by driving the corresponding register. A data signal, a clock signal and a strobe signal corresponding to the selected map data, is output to an LCD driver to display the same on the LCD unit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 3 is a diagram showing a display state of menus according to the present invention.

DETAILED DESCRIPTION OF PREFERRED EMBODIMENTS

Figure 1:
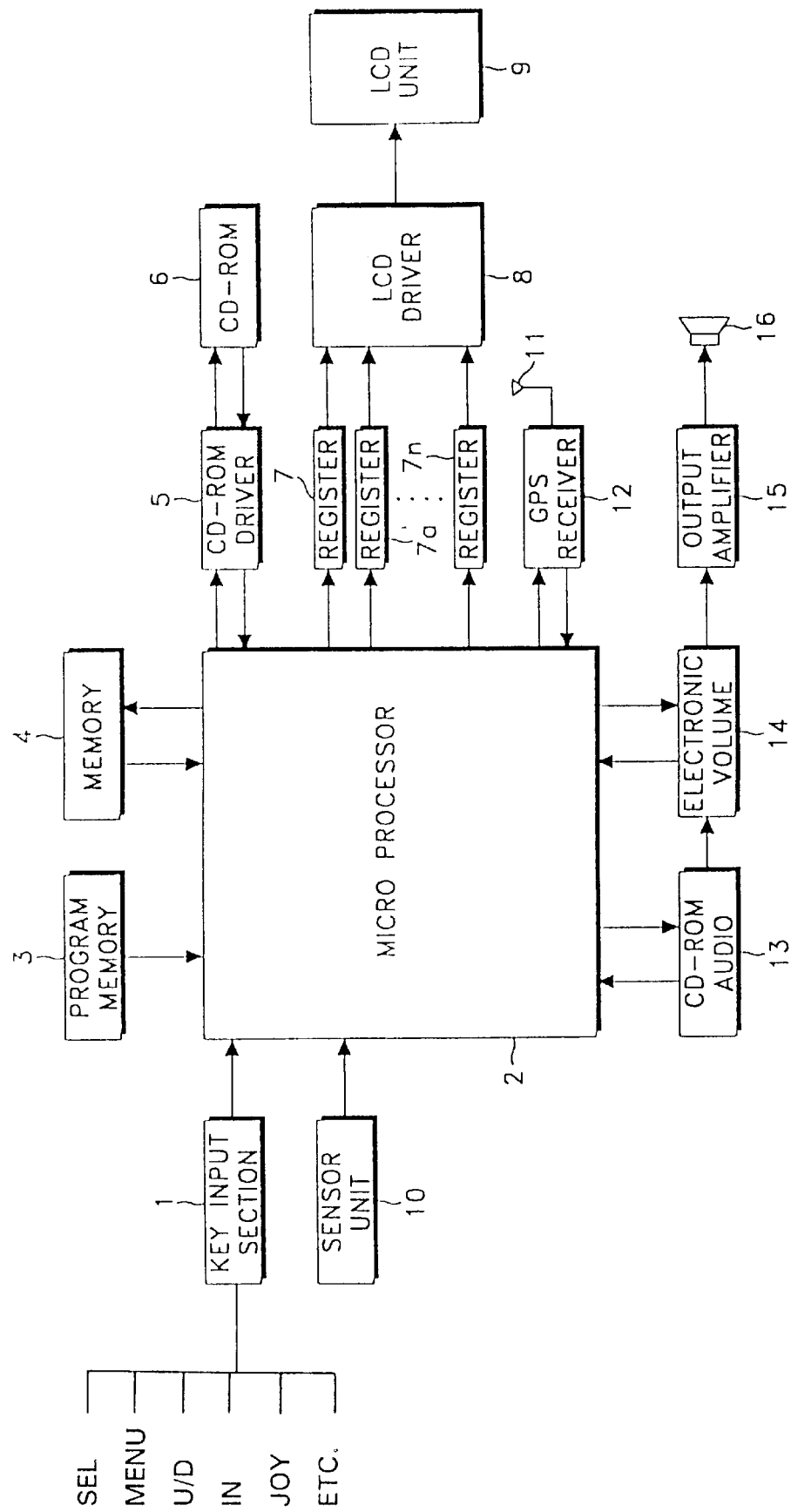
FIG. 1 is a block diagram showing an overall configuration of a traffic guidance system.

Referring to FIG. 1, a key input section 1 receives user selected input and includes a select key SEL, a menu select key MENU, an up/down key U/D, an input key IN, a position select joystick JOY, etc., in addition to keys for operating a car. A microprocessor 2 controls internal operations resulting from an input received through key input section 1 by a control method and procedure stored in program memory 3. A memory 4, controlled by the microprocessor 2, temporarily stores and then generates operation data. A CD-ROM driver 5 controlled by the microprocessor 2 selectively generates map data stored in a CD-ROM 6. A plurality of registers 7–7n selectively generate the map data read from the CD-ROM 6 according to a user selected menu setting. Microprocessor 2 generates a data signal selected through the registers 7–7n. The data signal is then output to a liquid crystal display (LCD) driver 8 which displays the map data, including a route to a destination on an LCD unit 9.

A sensor unit 10 supplies information to Microprocessor 2 relating to the current operating state of the car sensed through an earth magnetism sensor, a gyro sensor, a speed sensor, a brake sensor, etc. A GPS receiver 12 has an antenna 11 which receives a radio wave of data from a satellite indicating the state of the roads or the traveling direction of the car. A CD-ROM audio 13 generates audio guidance data as the car moves, and an electronic volume 14 adjusts the audio level generated from CD-ROM audio 13. CD-ROM audio 13 and electronic volume 14 are controlled by microprocessor 2. An output of the electronic volume 14 is amplified through an output amplifier 15 and generates an audible tone through speaker 16.

Figure 2:
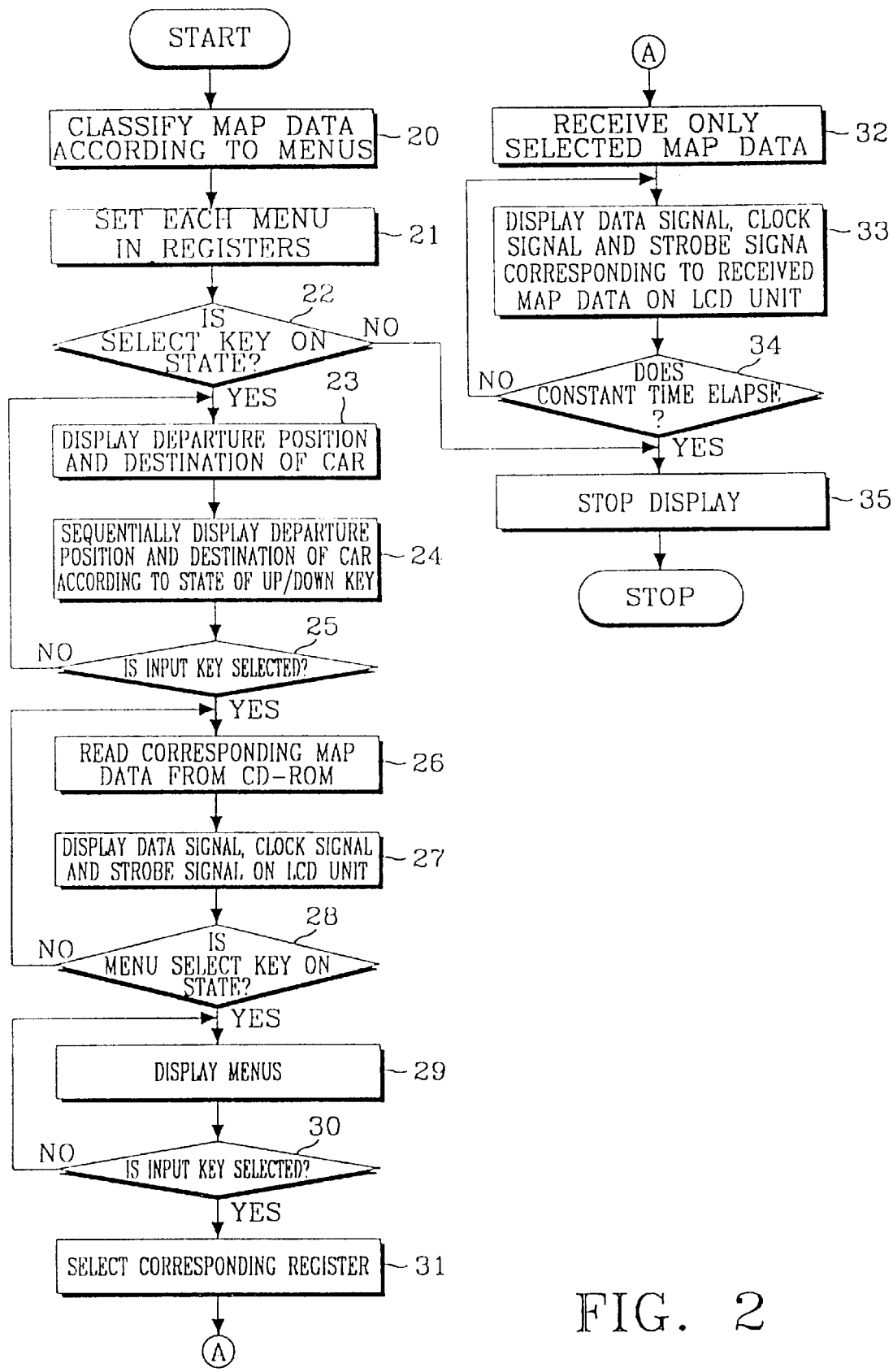
FIG. 2 is a flow chart of the method according to the present invention.

Referring to FIG. 2, in order to display the map data of the traffic guidance system, the map data stored in CD-ROM 6 is classified according to various kinds of menus (step 20). Each menu is set in one of the plurality of registers 7–7n such that the selection of map data of a corresponding menu can be read from CD-ROM driver 5 (step 21). Once the map data is classified and the registers are set, a determination as to whether the select key SEL, of key input section 1, is in an ON state, and whether a display mode of a map is selected, is made to obtain information about the traffic guidance during driving (step 22). If both conditions exist, microprocessor 2 causes LCD driver 8 to display the departure position and destination of the car on LCD unit 9 (step 23). The departure position and destination of the car are sequentially displayed on LCD unit 9 according to the state of up/down key U/D as pressed by the user (step 24). At step 25, the system monitors input key IN to determine if it has been depressed after the departure position and destination selection is made. If the user selects the departure position and destination through up/down key U/D and depresses input key IN, microprocessor 2 reads the corresponding map data between the two points from CD-ROM 6 through CD-ROM driver 5 (step 26). Microprocessor 2 then supplies a data signal, a clock signal and a strobe signal corresponding to the selected map data to LCD driver 8 so as to display the same on the LCD unit 9 (step 27).

At step 28, the system determines whether the menu select key MENU is in an ON state, and whether another display mode has been selected by the user. If both conditions exist, the menu choices are displayed on the LCD unit 9 (FIG. 3) to enable the user selection of a desired menu (step 29). The selection of a desired menu is performed by using the up/down key U/D to scroll through the menu choices and pressing input key IN to select the same, which is monitored at step 30. When input key IN is actuated, microprocessor 2 selects a corresponding register in which the desired menu is set (step 31), and receives only the selected map data among the map data read from the CD-ROM 6 by driving the corresponding register 7–7n (step 32). Microprocessor 2 supplies the data signal, the clock signal and the strobe signal corresponding to the received map data to LCD driver 8 to display the same on LCD unit 9. Thus, if the user selects a menu of a highway when the menu select key MENU is in an ON state, microprocessor 2 receives only data corresponding to the highway from the map data read from the CD-ROM 6 by driving the register 7 and supplying the data signal, the clock signal and the strobe signal corresponding thereto to LCD driver 8 to display the same on LCD unit 9. Therefore, a driver can safely confirm desired information while driving. A time out period for displaying map data is monitored after the initial display, and when the time elapses, (step 34) microprocessor 2 stops the display (step 35).

As described above, information including the map data is stored in the CD-ROM and data generated through the registers is classified according to various different menus. If the display mode of the map data is selected and then the desired menu is selected, the data signal, the clock signal and the strobe signal for displaying only the map data corresponding to the selected menu are generated. Thus, the driver can access desired data at any time and confirm his destination without adversely effecting the safety of their driving.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for displaying map data for use in an automotive traffic guidance system comprising the steps of:

classifying map data stored in a recording medium according to a plurality of menus;

setting each of the plurality of menus to a corresponding one of a plurality of registers; and selectively generating only the map data corresponding to a user's selection of at least one of said plurality of menus by selecting at least one of said plurality of registers corresponding to the user's selection of at least one of said plurality of menus.

2. The method according to claim 1, further comprising the steps of:

determining the user's departure position and destination;

displaying the user's departure position and destination; and displaying the plurality of map data menus for user selection.

3. The method according to claim 2, wherein said step of determining the user's departure position and destination further comprises the steps of:

sequentially displaying departure position and destination information in response to the user's actuation of an UP/DOWN key on a key input section; and receiving user confirmation of selected departure position and destination information.

4. The method according to claim 1, wherein said step of selectively generating further comprises the steps of:

receiving map data corresponding to the at least one selected register; and displaying the received map data on a liquid crystal display.

5. The method according to claim 1, wherein the recording medium is a CD-ROM.

6. A method for displaying map data for use in an automobile traffic guidance system comprising the steps of:

determining the operational state of a select key of a key input section;

determining the selection of a display mode;

displaying a departure position and destination of the automobile on an LCD unit in response to an ON state of the select key and a selected display mode;

reading map data of the destination from a recording medium in response to a user selection through an up/down key and an input key; and supplying a data signal, a clock signal and a strobe signal corresponding to the map data to an LCD driver to display the same on the LCD unit; the method further comprising the steps of:

determining the operative state of a menu select key;

determining if another display mode is selected;

displaying a plurality of menus on the LCD unit in response to an ON state determination of the menu select key and the selection of another display mode;

selecting a desired menu through the up/down key and the input key;

selecting a register set corresponding to the selected menu from a plurality of registers; and displaying only selected map data on an LCD.

7. The method according to claim 6, wherein said step of displaying only selected map data further comprises the steps of:

receiving only selected map data by driving the selected register; and supplying the data signal, the clock signal and the strobe signal corresponding to the selected map data to the LCD driver for display on the LCD.

8. The method according to claim 6, wherein the recording medium is a CD-ROM.

* * * * *